Patented Aug. 30, 1938

2,128,229

UNITED STATES PATENT OFFICE 2,128,229

TREATMENT OF CELLULOSIC MATERIALS AND PRODUCTS RESULTING THEREFROM

William Hale Charch, Buffalo, N. Y., and Dorothy Bateman Maney, Old Hickory, Tenn., assignors, by mesne assignments, to E. I. du Pont de Nemours & Company, Wilmington, Del., a corporation of Delaware No Drawing. Application March 23, 1935, Serial No. 12,738

25 Claims. (Cl. 154—40)

This invention relates to the treatment of cellulosic materials to improve the adhesion thereof to natural rubber, compounded rubber, rubber substitutes and the like. More particularly, it relates to methods for obtaining improved adhesion between rubber and cellulosic threads, filaments, cords, fabrics, and the like, and the products resulting from such methods. This invention is especially applicable to artificial threads as will be explained more in detail below.

In the past it has been found that artificial threads such as regenerated cellulose threads, filaments, cords, or the like, adhere very poorly to compounded rubber stock when the two are united and the rubber stock subsequently cured according to any of the known processes which produce commercially satisfactory adhesion between rubber and cotton. This poor adhesion of artificial threads to rubber has constituted a very serious obstacle to their use in place of cotton in the manufacture of automobile tires, reinforced rubber belts and similar products consisting of alternate plies of rubber and cord which are required to adhere very strongly for long periods of time under drastic conditions of high temperature, constant flexing and bending, shock, etc. Artificial threads would frequently be preferable to cotton in such uses because of their higher tensile strength, especially at elevated temperatures and because of their continuous filament structure. If rayon cord, for example, is pressed into commercial rubber stock such as is customarily used in the manufacture of tires or belting and the whole is cured at high pressure and at an elevated temperature sufficient to completely vulcanize the rubber stock, it will be observed that the rayon cord can be pulled away from the rubber with comparative facility. Indeed, if subjected to a standard pull-out test which measures the force required to separate the cord from the rubber, rayon cord is found to adhere to rubber only approximately half as well as a similar cotton cord submitted to the same test. To improve the adhesion of rayon to rubber sufficiently to permit its use in place of cotton in the fabrication of tires, belts, and the like, in which rayon is desirable because of its aforesaid advantages, it is known to treat rayon cord with a dispersion of rubber or latex before combining the cord and the rubber stock for curing or vulcanization. This treatment somewhat improves the adhesion between rayon and rubber, but the adhesion thus obtained is still far inferior to that between cotton and rubber and as a consequence rayon cannot be used successfully in the fabrication of such articles as the above.

We have now discovered that certain heat hardening synthetic resins, when applied to rayon cord, will very greatly improve its adhesion to rubber. We have also found that the adhesion of rayon cord to rubber is still further improved if the resin is combined with a dispersion of rubber or latex or a solution of rubber and applied to the cord. This invention enables us to produce a rayon-reinforced rubber structure that is at least equal to and usually better, insofar as adhesion of the cord to the rubber is concerned, than similar cotton reinforced rubber structures.

It is an object of this invention to provide a method of securing improved adhesion between cellulosic material and rubber.

It is another object of this invention to provide a method for securing improved adhesion between rayon or other filamentous forms of regenerated cellulose and rubber.

A more specific object of this invention is to provide a method for securing improved adhesion between filaments or threads of cellulosic material and rubber by means of certain heat-hardening synthetic resins in combination with the said filaments, threads, or the like.

A still further object of this invention is to produce artificial threads such as regenerated cellulose, to which rubber may be more firmly adhered by reason of the presence on and/or in the artificial threads of certain heat-hardening, synthetic resins, preferably together with dispersed rubber or latex.

Other objects will appear from the following description and appended claims.

The objects of the invention are accomplished in general by applying to cellulosic structures, such as cellulosic threads or the like, a treating composition containing certain heat-hardening synthetic resins, and preferably also dispersed rubber or latex, whereby to improve the adhesion between the cellulosic thread and rubber after their combination and vulcanization of the rubber.

In order to set forth more clearly and concisely the principles of the invention, it will be described with particular reference to rayon made by the viscose process and having a high dry tensile strength of 2 grams or more per denier, and preferably of 2.5 grams or more per denier, in the form of heavy cords. It is to be understood, however, that any cellulosic filament, thread or cord, whether of cotton, of a cellulose ester or ether or hydroxy ether, or the like, or of regenerated cellulose made by the cuprammonium or other process, is contemplated as being within the scope of this invention. The invention includes cords and fabrics of any type of construction made from such cellulosic threads or filaments. Obviously, where a cellulose derivative, such as cellulose acetate, which is thermoplastic in nature, is used, the temperature to which the material is subjected in the various steps of the process must be kept well below the softening point of the cellulose derivative. Furthermore, the materials, with which the derivative is treated must be so chosen that the steps of the process can be carried out at a temperature below the softening point of the cellulose derivative.

The preferred cellulosic material used in this invention is in the form of strong rayon threads having a dry tensile strength at room temperature of about 2 grams per denier, prepared in the manner taught by H. H. Parker in his copending patent application Serial No. 676,463, filed June 19, 1933, or in the form of twisted structures, such as strands or cords plied from said strong rayon threads.

As the rubber to which such cellulosic thread structures will adhere, the invention contemplates any compounded natural rubber stock or any compounded synthetic rubber stock such as polymerized isoprene, or polymerized butadiene, or halogen substituted butadienes such as halogen-2-butadiene 1,3 polymer, e. g., chloro-2-butadiene 1,3 polymer, and other types. Moreover, the rubber may contain any desired vulcanizers, stabilizers, accelerators, et cetera, singly or in any desired combination. In its preferred and common form the invention contemplates any commercial compounded rubber stock such as is commonly employed in the fabrication of automobile tires, hose, raincoat material, shoes, belting such as conveyor belts, fan belts or other driving belts, or the like.

The term "rubber", unless otherwise modified, as used in the specification and claims, is intended to be used in its generic sense to include rubber substitutes, natural rubber, compounded rubber, synthetic rubbers, and the like.

The resins contemplated as being within the scope of this invention belong to the general class of heat-hardening aldehyde resins, preferably resins formed from phenolic compounds and aldehydes which are both water-soluble to the extent of ½ to 5% by weight. These resins should be capable of condensing, polymerizing or setting up rapidly and completely to a substantially insoluble, infusible form, with or without the presence of a catalyst or condensing agent, at temperatures of about 250° F. or less. The resins are made and applied to the cellulosic threads from an aqueous solution.

As phenolic compounds possessing the above-mentioned qualifications and therefore particularly satisfactory for use in the operation of this invention may be mentioned the polyphenols, and especially the polyphenols having the hydroxyl groups in the benzene nucleus meta with respect to one another, such as resorcinol, phloroglucinol and orcinol. The preferred concentration of phenolic compound in the solution or dispersion for treating cords is between 0.5 and 5% by weight. It is understood that the invention is not limited to these specific phenols. Other phenols can, of course, be used by suitably modifying the conditions under which they are used. Phenols having a low water-solubility for example less than 1% or 2% by weight often may be conveniently employed in the form of aqueous dispersions, and phenols which react rather slowly with formaldehyde or other aldehydes at the temperatures commonly used in this invention or even those phenol-aldehyde combinations that react quite rapidly can be caused partially to condense with the aldehyde before application to the rayon, thus lessening the time subsequently necessary for substantially complete polymerization or setting up.

Commonly, formaldehyde is the aldehyde used, but any aldehyde satisfying the foregoing qualifications as to water-solubility and time and temperature required for complete polymerization or setting up with the phenolic compound in question to a substantially insoluble, infusible resin is contemplated by this invention. For example, acetaldehyde or furfural may in some cases be substituted for formaldehyde either wholly or in part. Moreover, modifications in the method of procedure, such as have been discussed in connection with the choice of phenolic compound, may make possible the use of still other aldehydes which would not commonly be suitable because of low water-solubility or slowness in condensing and polymerizing completely with the phenolic compound to a substantially insoluble, infusible resin. The aldehyde is used preferably in some excess of that theoretically required per mol. of phenol in order to insure condensation of all the phenol present. If too little aldehyde be used, there is danger of some part of the phenolic compound present in the treating solution being left unreacted, in which case it may subsequently at least partially react with or counteract the effect of the accelerator present in the compounded rubber stock to which the cord is to be adhered and thus result in incomplete curing and poor adhesion.

If desirable, the time or temperature, or both, of drying the cord after passage through the aqueous solution of resin-forming materials, or the time or temperature, or both, of curing or vulcanization may be varied from those ordinarily used in manufacturing tires, belting, and the like, in order to insure complete condensation and polymerization of less readily reactive phenol-aldehyde combinations. However, as has been indicated, it is easily possible according to this invention and usually preferable to select for use in improving adhesion, phenols and aldehydes which can be satisfactorily applied to current commercial processes without necessitating any essential changes in procedure.

Usually it is desirable to add to the aqueous solution of resin-forming materials containing essentially a phenolic compound and an aldehyde, a small amount of catalyst or condensing agent for the resinification reaction. We prefer catalysts or condensing agents which are basic in nature. Of these sodium hydroxide is most commonly employed and may be added in any desired amount according to the special character of the solution in which it is to be used although amounts are preferred between 0.02% and 0.8% by weight. Where latex is to be used in combination with the resin the amount of NaOH should be preferably between 0.15% and 0.30%. The amount of alkaline catalyst may be more specifically determined by the pH required or desired in the solution of resin-forming materials and dispersed rubber or latex. It may be desirable to adjust the pH of the resin solution so that it will be approximately the same as the pH of the dispersed rubber or latex solution in which it is used. Thus, the amount of alkaline catalyst which is used may be determined by the amount required to bring the pH of the solution to some predetermined value, as for instance 8.5 to 9. Instead of sodium hydroxide, potassium hydroxide may of course be used, or any other suitable alkaline condensing agent.

While treatment of a cellulosic thread structure, especially rayon, with such an aqueous solution of resin-forming materials as has been described with subsequent polymerization or setting up of these materials to a substantially insoluble, infusible resin on and/or in the cellulosic structure greatly improves the adhesion of said cellulosic structure to rubber, it is preferred, according to this invention, to employ the treatment with an aqueous solution of resin-forming materials in combination with a rubber or latex treatment as giving still more marked improvement in adhesion. This may be accomplished in a number of ways, the simplest and most convenient of which contemplates the combination of aqueous dispersions of rubber or latex, whether artificial, natural, vulcanized or compounded, with the aqueous solution of resin-forming materials before application to the cellulosic thread structure. The latex or rubber may be present in the solution for treating the thread in any desired proportion although commonly the improvement in adhesion is most marked when such concentrations of rubber or latex are used that the percentage of rubber solids in the solution is between 5 and 40% by weight and preferably between 8 and 20% by weight. If a natural latex dispersion is used, it may be either a crude latex, a creamed latex, that is to say, a latex from which certain soluble materials such as sugars, acids, soluble resins, soluble proteins, etc. have been removed, or one which contains added materials, or one which has been treated to change the character of the rubber in it. Furthermore, it may contain any desired accelerators, vulcanizers, stabilizers, dispersing agents, or any other substances such as are commonly employed in the rubber industry. When rubber is used as an artificial dispersion in water of either natural rubber or of any known synthetic rubber, it may likewise contain additionally such substances as rubber accelerators, vulcanizers, stabilizers, dispersing agents, and the like. The thread-treating composition may also contain other materials such as casein, glutinous materials, water-soluble adhesives, wetting agents, and the like, which may be added as adhesives, stabilizers or for a variety of purposes without departing from the fundamental principle of this invention.

This invention also contemplates the steps of treating the cord with an aqueous solution of resin-forming materials such as above disclosed, subsequently drying the cord at temperatures sufficient to cause the formation of a substantially insoluble, infusible resin, and then treating the resulting resin-coated cord with a solution of rubber in toluene or other suitable solvent for rubber and removing said solvent by evaporation so that the cord finally has a coating of resin and thereover a coating of rubber. The rubber solution used may be a solution of either natural or synthetic rubber and may be of either crude, raw rubber or of rubber compounded with any one or several of a variety of accelerators, vulcanizers, stabilizers, and the like, which are commonly added to rubber, or of rubber otherwise modified.

Alternatively, the cord may be treated first with an aqueous solution of resin-forming materials consisting of a phenolic compound, an aldehyde and preferably a catalyst or condensing agent, and then with an aqueous solution of the resin-forming materials in the same or different concentration, to which dispersed rubber or latex also has been added. Moreover, the cord may be given still further treatments with this same solution of resin-forming materials containing dispersed rubber or latex or with different solutions in which, for example, the concentration of resin-forming materials is successively decreased and that of the rubber or latex successively increased or in which the concentration of resin-forming materials is the same in each case, but that of the dispersed rubber or latex is successively increased, or in which chemically dissimilar resin-forming materials are dissolved. In accordance with the preferred method of operation of the invention, after each aqueous treatment, the cord is dried before application of the next successive treatment. For certain purposes the application of successive treatments to the cord has special advantages. The nature of successive treatments or their order of succession may be varied in many ways, depending upon the purpose in view.

The adhesion between rubber and rayon which has been treated in accordance with this invention is improved to such a remarkable degree that after curing of the rubber, the adhesion is at least equal to and often considerably better than that obtained between cotton and rubber by the usual present day commercial practice, especially at high temperatures, and may be two, three, four, or more times that between untreated rayon and rubber. In addition to the excellent adhesion afforded by this new method for treating rayon, there are the further important advantages of cheapness and easy applicability to current methods of fabricating tires, reinforced rubber belts and the like. Moreover, rayon cords treated according to this invention and combined with rubber show good resistance to known fatigue tests.

Fatigue resistance of tire cord may be measured in a variety of ways, for example, the cord may be subjected, for a fixed period of time, to drastic conditions of flexing or bending and stretching either at room or elevated temperatures, conditions which are designed to approximate those encountered during the actual use of tires. The tensile strength of the cord after the prescribed flexing or bending and stretching, compared with the tensile strength before the test, gives one measure of the fatigue resistance of the cord. For rayon cord, treated according to this invention, the drop in tensile strength after such a fatigue resistance test is very slight, whereas the loss of tensile strength of latex-treated cotton cord under the same conditions is marked. Obviously this improved resistance to fatigue exhibited by rayon cord treated according to this invention is a great advantage in cord designed for use in tires, fan belts, and the like, which undergo constant and severe flexing, bending and stretching when in operation. Furthermore, the improvement in adhesion to rubber of rayon cord is even more marked at high temperatures of 270° F., for example, than at ordinary temperatures, a fact which is of the utmost importance in the construction of tires, fan belts and similar articles which develop very high temperatures under ordinary conditions of usage.

To indicate the improvements following from the practice of this invention, rubber reinforced with rayon cord treated with resins and rubber latex exhibits no separation of rubber and cord below about 200,000 flexings when dry, or below about 75,000 flexings when wet, whereas the corresponding figures for rubber reinforced with cotton cord are 29,000 when dry and 35,000 when wet.

In order more clearly to illustrate this invention, the following examples are given. It is, of course, to be understood that the invention is not limited to these precise examples which are merely illustrative of the invention.

Example I

An aqueous solution is made up containing 4% by weight of resorcinol, 3.2% by weight of formaldehyde (added as 2½ times that amount of commercial 40% formaldehyde) and 0.16% by weight of sodium hydroxide. After being allowed to stand for 12 to 18 hours at room temperature, or long enough to permit an initial condensation to take place between the resorcinol and formaldehyde, the solution is combined, with stirring, with an equal weight of aqueous crude natural rubber latex dispersion containing 40% rubber solids and with sufficient additional sodium hydroxide to bring the final concentration to 0.22% by weight of the total solution which now contains 2% by weight of resorcinol, 1.6% by weight of formaldehyde and 20% by weight of dispersed rubber solids.

Cord made from viscose process rayon and of construction suitable for use in automobile tires, for example, cord made from rayon threads, said threads having a dry strength at room temperature of about 3 grams per denier, produced in accordance with the process taught by H. H. Parker in the copending patent application Serial No. 676,463, filed June 19, 1933, is passed through the above composition slowly enough to be thoroughly wetted and is then dried at temperatures of 185° F. or higher, by passage over heated rollers or by other suitable means. The treated cord is laid upon thin sheets of compounded natural rubber stock and the whole subjected to such a pressure and temperature as to completely cure the rubber. After curing, the rayon cord is found to adhere very firmly to the rubber so that the pull-out force required to seperate the cord and rubber is at least twice as great as that required for the separation of untreated rayon and rubber and is approximately equal to or greater than that required in the case of cotton cord used in the manufacture of tires.

Example II

An aqueous solution is made up containing 2% by weight of resorcinol, 1.2% formaldehyde (added as 2½ times that amount of commercial 40% formaldehyde), 0.2% by weight of sodium hydroxide and 10% by weight of rubber solids in the form of dispersed natural rubber latex containing vulcanizers and accelerators. Rayon tire cord is passed through this solution, dried, applied to compounded natural rubber stock and the cord and rubber cured or vulcanized just as described in Example I to give a product exhibiting extraordinarily good adhesion between the rayon cord and the rubber, both hot and cold.

Example III

Rayon cord is impregnated with an aqueous solution containing 1% by weight of phloroglucinol, 0.8% by weight of formaldehyde, 0.02% by weight of sodium hydroxide and 2% by weight of rubber solids in the form of dispersed natural rubber latex. After drying at elevated temperatures of 185° F. or over, the cord is laid upon thin layers of compounded natural rubber stock containing suitable vulcanizers, accelerators, stabilizers, and the like, and is cured or vulcanized under pressure at an elevated temperature, after which the rubber and rayon are found to be firmly bound together.

Example IV

Viscose rayon cord is impregnated or wet with an aqueous solution containing 2% by weight of resorcinol, 1.2% by weight of formaldehyde, 0.2% by weight of sodium hydroxide and 10% by weight of rubber solids in the form of a dispersion of synthetic rubber such as chloro-2-butadiene-1,3 polymer dispersed in water. The cord is then dried at a temperature of 185° F. or higher by passage over heated rolls or by other suitable means and is then laid upon sheets of synthetic rubber stock such as chloro-2-butadiene 1,3 polymer compounded with sulfur, wood rosin, magnesium oxide, zinc oxide or other suitable accelerators, vulcanizers or stabilizers, if desired, and subjected to pressure and temperature sufficient completely to cure or vulcanize the synthetic rubber stock.

Example V

Viscose rayon cord is impregnated with an aqueous solution containing 2% by weight of resorcinol, 1.6% by weight of formaldehyde, 0.2% by weight of sodium hydroxide and 8% by weight of rubber solids in the form of natural rubber latex containing suitable accelerators, vulcanizers, stabilizers, and the like. The cord is then dried at temperatures of approximately 185° F. and is placed upon sheets of commercial compounded natural rubber stock which is subjected to pressure and elevated temperatures to secure complete curing or vulcanization.

Example VI

Viscose rayon cord is passed through an aqueous solution containing 2% by weight of resorcinol, 1.2% by weight of formaldehyde, 0.2% by weight of sodium hydroxide and 10% by weight of rubber solids in the form of a natural rubber latex dispersion containing a suitable combination of vulcanizers, accelerators, stabilizers and the like. After drying at temperatures of not less than 185° F., the cord is subjected to a second treatment with an aqueous solution containing 2% by weight of resorcinol, 1.2% by weight of formaldehyde, 0.2% by weight of sodium hydroxide and 17.5% by weight of rubber solids in the form of a rubber latex dispersion and again dried at a temperature not lower than 185° F., after which it is placed upon sheets of compounded natural rubber stock which is then cured or vulcanized under pressure and at elevated temperatures.

Example VII

Viscose rayon cord is impregnated with an aqueous solution containing 2% by weight of resorcinol, 1.6% by weight of formaldehyde and 0.08% by weight of sodium hydroxide which has been allowed to age at room temperature for 12 to 18 hours before using. The cord is then dried at 185° F. and cured or vulcanized with sheets of compounded natural rubber stock under pressure and at temperatures of approximately 270° F.

Example VIII

Cotton cord such as is used in the fabrication of automobile tires is passed through an aqueous solution containing 2% by weight of resorcinol, 1.6% by weight of formaldehyde, 0.2% by weight of sodium hydroxide and 10% by weight of rubber solids in the form of dispersed natural rubber latex containing sulfur and suitable accelerators and stabilizers. The cord is then dried at elevated temperatures of preferably 185° F. or greater and applied to sheets of commercial compounded rubber stock for curing and vulcanization according to conditions currently employed in the manufacture of tires.

A particularly good latex for use according to the methods described, for example, in Examples I, II, III, IV, VI and VIII, comprises a so-called creamed latex prepared by treating natural rubber latex with soap, ammonium alginate, and the like, creaming as by whipping or other vigorous agitation at a temperature of 70–90° C., skimming, and using the top portion which has been skimmed off. The creamed latex is then used in the same way as the various latices disclosed in the examples.

Instead of drying the cord at elevated temperature such as 185° F. as set forth in the preceding examples, the impregnated cord may be dried at room temperature or thereabouts and subsequently vulcanized to the rubber at the customary temperatures.

Since it is obvious that many changes and modifications of the invention can be made within the nature and spirit thereof, it is to be understood that the invention is not to be limited thereto except as set forth in the appended claims.

We claim:

1. In the process of manufacturing reinforced rubber articles such as rubber tires and the like, the steps which comprise treating cords, fabrics and the like, prepared from regenerated cellulose threads having a dry tenacity at room temperature of above 2 grams per denier and obtained from viscose, with an aqueous solution containing natural rubber latex together with resorcinol and formaldehyde which may be at least partially in the form of an initial condensation product, formaldehyde being present in an amount capable of forming an infusible, insoluble resin, and an alkaline catalyst, drying the cord, fabrics and the like so treated, plying the same with sheets of commercial compounded vulcanizable natural rubber, and then subjecting the mass to a vulcanizing temperature.

2. In the process of manufacturing reinforced rubber articles such as rubber tires and the like, the steps which comprise treating cords, fabrics and the like, prepared from regenerated cellulose threads having a dry tenacity at room temperature of above 2 grams per denier and obtained from viscose, with an aqueous solution containing rubber latex together with resorcinol and formaldehyde which may be at least partially in the form of an initial condensation product, formaldehyde being present in an amount capable of forming an infusible, insoluble resin, and an alkaline catalyst, drying the cords, fabrics and the like so treated, plying the same with sheets of commercial compounded vulcanizable rubber, and then subjecting the mass to a vulcanizing temperature.

3. In the process of manufacturing reinforced rubber articles such as rubber tires and the like, the steps which comprise treating cords, fabrics and the like, prepared from regenerated cellulose threads having a dry tenacity at room temperature of above 2 grams per denier and obtained from viscose, with an aqueous solution containing rubber latex together with phloroglucinol and formaldehyde which may be at least partially in the form of an initial condensation product, formaldehyde being present in an amount capable of forming an infusible, insoluble resin, and an alkaline catalyst, drying the cords, fabrics and the like so treated, plying the same with sheets of commercial compounded vulcanizable rubber, and then subjecting the mass to a vulcanizing temperature.

4. In the process of manufacturing reinforced rubber articles such as rubber tires and the like, the steps which comprise treating cords, fabrics and the like, prepared from regenerated cellulose threads having a dry tenacity at room temperature of above 2 grams per denier with an aqueous solution containing rubber latex together with a polyhydric phenol and formaldehyde which may be at least partially in the form of an initial condensation product, formaldehyde being present in an amount capable of forming an infusible, insoluble resin, and an alkaline catalyst, drying the cords, fabrics and the like so treated, plying the same with sheets of commercial compounded vulcanizable rubber, and then subjecting the mass to a vulcanizing temperature.

5. In the process of manufacturing reinforced rubber articles such as rubber tires and the like, the steps which comprise treating cords, fabrics and the like, prepared from regenerated cellulose threads having a dry tenacity at room temperature of above 2 grams per denier with an aqueous solution containing rubber latex together with a polyhydric phenol and an aldehyde which may be at least partially in the form of an initial condensation product, formaldehyde being present in an amount capable of forming an infusible, insoluble resin, and an alkaline catalyst, drying the cords, fabrics and the like so treated, plying the same with sheets of commercial compounded vulcanizable rubber, and then subjecting the mass to a vulcanizing temperature.

6. In the process of manufacturing reinforced rubber articles such as rubber tires and the like, the steps which comprise treating cords, fabrics, and the like, prepared from regenerated cellulose threads having a dry tenacity at room temperature of above 2 grams per denier with an aqueous solution containing rubber latex together with a polyhydric phenol, sufficient aldehyde to react with a polyhydric phenol and an aldehyde which may be at least partially in the form of an initial condensation product, formaldehyde being present in an amount capable of forming an infusible, insoluble resin, and a resin-forming catalyst, drying the cords, fabrics and the like so treated, plying the same with sheets of commercial compounded vulcanizable rubber, and then subjecting the mass to a vulcanizing temperature.

7. In the process of manufacturing reinforced rubber articles such as rubber tires and the like, the steps which comprise treating cords, fabrics and the like, prepared from regenerated cellulose threads having a dry tenacity at room temperature of above 2 grams per denier with an aqueous solution containing rubber latex together with a polyhydric phenol and sufficient aldehyde to react with a polyhydric phenol and an aldehyde which may be at least partially in the form of an initial condensation product, formaldehyde being present in an amount capable of forming an infusible, insoluble resin, drying the cords, fabrics and the like so treated, plying the same with sheets of commercial compounded vulcanizable rubber, and then subjecting the mass to a vulcanizing temperature.

8. In the process of manufacturing reinforced rubber articles such as rubber tires and the like, the steps which comprise treating cords, fabrics and the like, prepared from artificial cellulosic threads, with an aqueous solution containing rubber latex together with a polyhydric phenol and an aldehyde which may be at least partially in the form of an initial condensation product, the aldehyde being present in an amount capable of forming an infusible, insoluble resin, drying the cords, fabrics and the like so treated, plying the same with sheets of commercial compounded vulcanizable rubber, and then subjecting the mass to a vulcanizing temperature.

9. In the process of manufacturing reinforced rubber articles such as rubber tires and the like, the steps which comprise treating cords, fabrics and the like composed of artificial cellulosic thread with an aqueous solution containing a phenol and an aldehyde which may be partially in the form of an initial condensation product, the aldehyde being present in an amount capable of forming an infusible, insoluble resin, drying the cords, fabrics and the like so treated, plying the same with sheets of commercial compounded vulcanizable rubber, and then subjecting the mass to a vulcanizing temperature.

10. The process which comprises treating articles comprising regenerated cellulose threads having a dry tenacity at room temperature of above 2 grams per denier and obtained from viscose, with an aqueous solution containing natural rubber latex together with resorcinol and formaldehyde which may be partially in the form of an initial condensation product, formaldehyde being present in an amount capable of forming an infusible, insoluble resin, and an alkaline catalyst, and subsequently heating said articles, so treated, at a temperature sufficiently elevated to convert the resin-forming materials at least partially to an infusible, insoluble resin, associating the article so treated with vulcanizable rubber, and then subjecting the mass to a vulcanizing temperature.

11. The process which comprises treating articles comprising regenerated cellulose threads having a dry tenacity at room temperature of above 2 grams per denier and obtained from viscose, with an aqueous solution containing resorcinol and formaldehyde which may be partially in the form of an initial condensation product, formaldehyde being present in an amount capable of forming an infusible, insoluble resin, and an alkaline catalyst, and subsequently heating said articles, so treated, at a temperature sufficiently elevated to convert the resin-forming materials at least partially to an infusible, insoluble resin, associating the article so treated with vulcanizable rubber, and then subjecting the mass to a vulcanizing temperature.

12. The process which comprises treating articles comprising regenerated cellulose threads having a dry tenacity at room temperature of above 2 grams per denier and obtained from viscose, with an aqueous solution containing phloroglucinol and formaldehyde which may be partially in the form of an initial condensation product, formaldehyde being present in an amount capable of forming an infusible, insoluble resin, and an alkaline catalyst, and subsequently heating said articles, so treated, at a temperature sufficiently elevated to convert the resin-forming materials at least partially to an infusible, insoluble resin, associating the article so treated with vulcanizable rubber, and then subjecting the mass to a vulcanizing temperature.

13. The process which comprises treating articles comprising regenerated cellulose threads having a dry tenacity at room temperature of above 2 grams per denier, with an aqueous solution containing a polyhydric phenol and formaldehyde which may be partially in the form of an initial condensation product, formaldehyde being present in an amount capable of forming an infusible, insoluble resin, and an alkaline catalyst, and subsequently heating said articles, so treated, at a temperature sufficiently elevated to convert the resin-forming materials at least partially to an infusible, insoluble resin, associating the article so treated with vulcanizable rubber, and then subjecting the mass to a vulcanizing temperature.

14. The process which comprises treating articles comprising regenerated cellulose threads having a dry tenacity at room temperature of above 2 grams per denier, with an aqueous solution containing a polyhydric phenol and aldehyde which may be partially in the form of an initial condensation product, aldehyde being present in an amount capable of forming an infusible, insoluble resin, and an alkaline catalyst, and subsequently heating the cords, fabrics, and the like, so treated, at a temperature sufficiently elevated to convert the resin-forming materials at least partially to an infusible, insoluble resin, associating the article so treated with vulcanizable rubber, and then subjecting the mass to a vulcanizing temperature.

15. The process which comprises treating articles comprising regenerated cellulose threads having a dry tenacity at room temperature of above 2 grams per denier, with an aqueous solution containing a polyhydric phenol and aldehyde which may be partially in the form of an initial condensation product, aldehyde being present in an amount capable of forming an infusible, insoluble resin, and a resin-forming catalyst, and subsequently heating said articles, so treated, at a temperature sufficiently elevated to convert the resin-forming materials at least partially to an infusible, insoluble resin, associating the article so treated with vulcanizable rubber, and then subjecting the mass to a vulcanizing temperature.

16. The process which comprises treating articles comprising regenerated cellulose threads having a dry tenacity at room temperature of above 2 grams per denier, with an aqueous solution containing a polyhydric phenol and aldehyde which may be partially in the form of an initial condensation product, aldehyde being present in an amount capable of forming an infusible, insoluble resin, and subsequently treating said articles to convert the resin-forming materials thereon at least partially to an infusible, insoluble resin, associating the article so treated with vulcanizable rubber, and then subjecting the mass to a vulcanizing temperature.

17. The process which comprises treating articles comprising artificial cellulosic threads, with an aqueous solution containing a polyhydric phenol and aldehyde which may be partially in the form of an initial condensation product, aldehyde being present in an amount capable of forming an infusible, insoluble resin, and subsequently treating said articles to convert the resin-forming materials thereon at least partially to an infusible, insoluble resin, associating the article so treated with vulcanizable rubber, and then subjecting the mass to a vulcanizing temperature.

18. The process which comprises treating threads, cords, fabrics and the like composed of artificial cellulosic thread, with an aqueous solution containing a polyhydric phenol and aldehyde which may be partially in the form of an initial condensation product, aldehyde being present in an amount capable of forming an infusible, insoluble resin, and subsequently treating the threads, cords, fabrics, and the like, to convert the resin-forming materials thereon at least partially to an infusible, insoluble resin, associating the article so treated with vulcanizable rubber, and then subjecting the mass to a vulcanizing temperature.

19. Rubber articles, such as rubber tires and the like, reinforced with cords, fabrics, and the like, prepared from regenerated cellulose threads having a dry tenacity at room temperature of above 2 grams per denier, said cords being adhered to the rubber in said articles by means of a composition comprising an infusible, insoluble resorcinol-formaldehyde resin and rubber.

20. Rubber articles, such as rubber tires and the like, reinforced with cords, fabrics, and the like, prepared from regenerated cellulose threads having a dry tenacity at room temperature of above 2 grams per denier, said cords being adhered to the rubber in said articles by means of a composition comprising an infusible, insoluble phloroglucinol-formaldehyde resin and rubber.

21. Rubber articles, such as rubber tires and the like, reinforced with cords, fabrics, and the like, prepared from regenerated cellulose threads having a dry tenacity at room temperature of above 2 grams per denier, said cords being adhered to the rubber in said articles by means of a composition comprising an infusible, insoluble polyhydric phenol-formaldehyde resin, and rubber.

22. Rubber articles, such as rubber tires and the like, reinforced with cords, fabrics, and the like, prepared from regenerated cellulose threads having a dry tenacity at room temperature of above two grams per denier, said cords being adhered to the rubber in said articles by means of a composition comprising an infusible, insoluble polyhydric phenol-formaldehyde resin.

23. Rubber articles, such as rubber tires and the like, reinforced with cords, fabrics, and the like, prepared from regenerated cellulose threads having a dry tenacity at room temperature of above two grams per denier, said cords being adhered to the rubber in said articles by means of a composition comprising an infusible, insoluble phenol-aldehyde resin.

24. Rubber articles reinforced with cords, fabrics and the like composed of artificial cellulosic threads which are adhered to the rubber by means of a composition comprising an infusible, insoluble polyhydric phenol-aldehyde resin and synthetic rubber.

25. Rubber articles reinforced with cords, fabrics and the like composed of artificial cellulosic threads which are adhered to the rubber by means of a composition comprising an infusible, insoluble phenol-aldehyde resin and synthetic rubber.

WILLIAM HALE CHARCH.
DOROTHY BATEMAN MANEY.

CERTIFICATE OF CORRECTION.

Patent No. 2,128,229.   August 30, 1938.

WILLIAM HALE CHARCH, ET AL.

It is hereby certified that error appears in the printed specification of the above numbered patent requiring correction as follows: Page 2, first column, line 19, for the word "about" read above; page 4, first column, line 53, for "seperate" read separate; page 5, second column, lines 53 and 54, claim 6, strike out the comma and words ", sufficient aldehyde to react with a polyhydric phenol"; and lines 70 and 71, claim 7, strike out the words "and sufficient aldehyde to react with a polyhydric phenol"; and that the said Letters Patent should be read with this correction therein that the same may conform to the record of the case in the Patent Office.

Signed and sealed this 22nd day of November, A. D. 1938.

Henry Van Arsdale (Seal)   Acting Commissioner of Patents.

treated with vulcanizable rubber, and then subjecting the mass to a vulcanizing temperature.

18. The process which comprises treating threads, cords, fabrics and the like composed of artificial cellulosic thread, with an aqueous solution containing a polyhydric phenol and aldehyde which may be partially in the form of an initial condensation product, aldehyde being present in an amount capable of forming an infusible, insoluble resin, and subsequently treating the threads, cords, fabrics, and the like, to convert the resin-forming materials thereon at least partially to an infusible, insoluble resin, associating the article so treated with vulcanizable rubber, and then subjecting the mass to a vulcanizing temperature.

19. Rubber articles, such as rubber tires and the like, reinforced with cords, fabrics, and the like, prepared from regenerated cellulose threads having a dry tenacity at room temperature of above 2 grams per denier, said cords being adhered to the rubber in said articles by means of a composition comprising an infusible, insoluble resorcinol-formaldehyde resin and rubber.

20. Rubber articles, such as rubber tires and the like, reinforced with cords, fabrics, and the like, prepared from regenerated cellulose threads having a dry tenacity at room temperature of above 2 grams per denier, said cords being adhered to the rubber in said articles by means of a composition comprising an infusible, insoluble phloroglucinol-formaldehyde resin and rubber.

21. Rubber articles, such as rubber tires and the like, reinforced with cords, fabrics, and the like, prepared from regenerated cellulose threads having a dry tenacity at room temperature of above 2 grams per denier, said cords being adhered to the rubber in said articles by means of a composition comprising an infusible, insoluble polyhydric phenol-formaldehyde resin, and rubber.

22. Rubber articles, such as rubber tires and the like, reinforced with cords, fabrics, and the like, prepared from regenerated cellulose threads having a dry tenacity at room temperature of above two grams per denier, said cords being adhered to the rubber in said articles by means of a composition comprising an infusible, insoluble polyhydric phenol-formaldehyde resin.

23. Rubber articles, such as rubber tires and the like, reinforced with cords, fabrics, and the like, prepared from regenerated cellulose threads having a dry tenacity at room temperature of above two grams per denier, said cords being adhered to the rubber in said articles by means of a composition comprising an infusible, insoluble phenol-aldehyde resin.

24. Rubber articles reinforced with cords, fabrics and the like composed of artificial cellulosic threads which are adhered to the rubber by means of a composition comprising an infusible, insoluble polyhydric phenol-aldehyde resin and synthetic rubber.

25. Rubber articles reinforced with cords, fabrics and the like composed of artificial cellulosic threads which are adhered to the rubber by means of a composition comprising an infusible, insoluble phenol-aldehyde resin and synthetic rubber.

WILLIAM HALE CHARCH.
DOROTHY BATEMAN MANEY.

CERTIFICATE OF CORRECTION.

Patent No. 2,128,229. August 30, 1938.

WILLIAM HALE CHARCH, ET AL.

It is hereby certified that error appears in the printed specification of the above numbered patent requiring correction as follows: Page 2, first column, line 19, for the word "about" read above; page 4, first column, line 53, for "seperate" read separate; page 5, second column, lines 53 and 54, claim 6, strike out the comma and words ", sufficient aldehyde to react with a polyhydric phenol"; and lines 70 and 71, claim 7, strike out the words "and sufficient aldehyde to react with a polyhydric phenol"; and that the said Letters Patent should be read with this correction therein that the same may conform to the record of the case in the Patent Office.

Signed and sealed this 22nd day of November, A. D. 1938.

Henry Van Arsdale (Seal)

Acting Commissioner of Patents.